United States Patent [19]

Lumpkin

[11] Patent Number: 5,538,107
[45] Date of Patent: Jul. 23, 1996

[54] OFF-SET BRAKE ARM

[75] Inventor: Wayne R. Lumpkin, Englewood, Colo.

[73] Assignee: Avid Enterprises, Inc., Englewood, Colo.

[21] Appl. No.: 471,720

[22] Filed: Jun. 6, 1995

[51] Int. Cl.$^6$ .................................. B62L 3/00; B62L 1/14
[52] U.S. Cl. ...................................... 188/24.21; 188/24.12
[58] Field of Search ............................ 188/24.21, 24.12, 188/24.22, 24.19; 403/53, 59

[56] References Cited

U.S. PATENT DOCUMENTS

| 619,395 | 2/1899 | Crossley. | |
|---|---|---|---|
| 700,350 | 5/1902 | Main. | |
| 4,051,924 | 10/1977 | Yoshigai. | |
| 4,055,235 | 10/1977 | Tanaka et al. . | |
| 5,058,450 | 10/1991 | Yoshigai | 188/24.21 |
| 5,133,432 | 7/1992 | Yoshigai | 188/24.21 |
| 5,373,918 | 12/1994 | Nagano | 188/24.21 |

FOREIGN PATENT DOCUMENTS

| 685353 | 8/1930 | France. |
|---|---|---|
| 3804581A1 | 8/1989 | Germany. |
| 5-139362(A) | 6/1993 | Japan. |
| 265085 | 11/1949 | Switzerland. |

Primary Examiner—Matthew C. Graham
Attorney, Agent, or Firm—Swanson & Bratschun

[57] ABSTRACT

The present invention is an improved cantilever brake for a cycle. The cantilever brake is attachable to a pair of attachment studs extending from a cycle frame. The cantilever brake includes a pair of elongate brake arms each having an integral brake arm base at its proximal end. The brake arm base forms a cylindrical cavity transverse the brake arm, the cylindrical cavity having a main portion with a diameter to receive a main body portion of the attachment stud and an enlarged diameter portion at one end of a diameter to receive an enlarged shoulder of an attachment stud. The brake arm, which is rotatable around the attachment stud, extends from the brake arm base over the enlarged diameter portion of the brake arm base cylindrical cavity. A pair of brake pad adjustment assemblies each receives one of the pair of cylindrical brake arms. The brake pad adjustment assemblies are movable lengthwise of the cylindrical brake arm and are rotatable about the cylindrical brake arm. Each brake pad adjustment assembly includes a first clamp for gripping a pad post of a brake pad assembly and a second clamp for maintaining the brake pad adjustment assembly at a select position lengthwise and rotation wise of the brake arm. With an attachment stud received in the cylindrical cavity of the brake arm base and the first clamp rotated away from the enlarged cylindrical portion, the first clamp overlies the attachment stud.

5 Claims, 3 Drawing Sheets

OFF-SET BRAKE ARM

BACKGROUND OF THE INVENTION

1. Technical Field

The present invention is directed toward cycle brakes, and more particularly toward a cantilever brake for a cycle.

2. Background Art

Conventional cantilever brakes include include a pair of brake arms rotatably attached to a pair of attachment studs extending from the frame of a cycle on opposite sides of a wheel upon which the brake operates. A brake pad assembly is attached to each of the brake arms for positioning a brake pad in a select position with respect to a tire rim. Distal ends of the brake arms are attached by a straddle cable and a brake cable operated by a lever on the handle bar of the cycle is attached to the center of the straddle cable. Squeezing the brake lever on the handle bar draws the brake cable upward which in turn pulls up on the straddle cable, thereby pulling the brake arms toward one another and bringing the brake pads into contact with the wheel rim. In the typical brake assembly, springs are provided between the brake arms and the bicycle frame for biasing the brake arms away from one another and away from the rim. Conventional cantilever brakes for bicycles are disclosed in Yoshagi, U.S. Pat. No. 5,058,450, and Nagano, U.S. Pat. No. 5,373,918. The attachment studs are the uniform structures as can be observed in both the U.S. Pat. No. '450 and the U.S. Pat. No. '918 patent. Attachment studs include a uniform diameter body having an increased diameter shoulder at a proximal end of the attachment stud.

As illustrated in the U.S. Pat. No. '450 patent and the U.S. Pat. No. '918 patent, standard cantilever brake arms have a non-symmetric shape and a dedicated point of attachment of a brake pad assembly to the brake arm. As a result, it is difficult or impossible to move the brake pad assembly up and down enough to make the cantilever brakes fully adaptable to all cycles. In addition, these designs provide very limited ability to rotate the brake pad assembly about a lengthwise axis of the brake arm, making it difficult to effectively adjust the "toe" of the brake pad. Furthermore, the non-symmetric shape of the brake arm results in a brake arm which is of a lesser dimension (and therefore weaker) normal to the direction of brake arm actuation, leaving the brake arm subject to deformation or damage from impact normal to their direction of movement.

One solution to some of these serious problems with conventional brake arm structures is a cylindrical brake arm. Marinovative, of Marin County, Calif., was an early maker of brakes featuring cylindrical brake arms. Other brake manufacturers have also incorporated the cylindrical brake arm design. These brakes solved some of the problems discussed above. Most notably, some designs provided a full range of movement of the brake pads lengthwise of the brake arm, as well as rotation about a lengthwise axis of the brake arms. However, these brakes created some new problems. In particular, standard brake designs, including the previously discussed cylindrical brake arm designs, mount the brake arm to a brake arm base so that the brake arm extends from above the uniform diameter portion of an attachment stud. This design is illustrated in FIG. 4. A problem with this design is that commonly the point of attachment of the brake pad assembly to the brake arm extends beyond the end of the attachment stud (see FIG. 4). The prior art recognized the advantages of positioning the point of attachment of the brake pad assembly over the attachment stud. In order to accomplish this, prior art structures provided non-linear or bent brake arms. Examples are the U.S. Pat. No. '918 patent discussed above and Yoshagi, U.S. Pat. No. 5,133,432. This solution is not available for cylindrical brake arms because it is difficult to bend a cylinder in this manner and such bending restricts the lengthwise movement of a brake pad adjustment assembly, thereby negating in part the adjustability advantage of cylindrical brake arms. As a result, prior art cylindrical brake arm cantilever brakes have the brake pad adjustment assembly cantilevered beyond the end of the stud. As the brakes are used the studs are deflected, resulting in the brake pad connecting with the tire rim unevenly, as illustrated in FIG. 4. This causes decreased braking efficiency and uneven brake pad wear. Deflection of the stud in this manner also creates a "soft" feel in the brakes, making the brakes seem less responsive. In addition, the cantilever effect leads to uneven wear between the brake arm base and the attachment stud. The present invention is directed toward overcoming one or more of the deficiencies discussed above.

SUMMARY OF THE INVENTION

The present invention is an improved cantilever brake for a cycle. The cantilever brake is attachable to a pair of attachment studs extending from a cycle frame. The attachment studs are of uniform and standard dimensions and each includes an enlarged diameter shoulder proximate the cycle frame and a uniform diameter cylindrical body extending from the enlarged diameter shoulder. The cantilever brake includes a pair of elongate brake arms each having an integral brake arm base at its proximal end. The brake arm base forms a cylindrical cavity transverse the brake arm, the cylindrical cavity having a main portion with a diameter sized to receive a main body portion of the attachment stud and an enlarged diameter portion at one end of a diameter to receive an enlarged shoulder of an attachment stud. The brake arm, which is rotatable around the attachment stud, extends from the brake arm base over the enlarged diameter portion of the brake arm base cylindrical cavity. A pair of brake pad adjustment assemblies each receives one of the pair of cylindrical brake arms. The brake pad adjustment assemblies are movable lengthwise of the cylindrical brake arm and are rotatable about the cylindrical brake arm. Each brake pad adjustment assembly includes a first clamp for gripping a pad post of a brake pad assembly and a second clamp for maintaining the brake pad adjustment assembly at a select position lengthwise and rotation wise of the brake arm. With an attachment stud received in the cylindrical cavity of the brake arm base and the second clamp rotated away from the enlarged cylindrical portion, the second clamp overlies the attachment stud.

The cantilever brake may include a cylindrical sleeve extending beyond the brake arm opposite the enlarged diameter portion of the cylindrical cavity, the cylindrical sleeve defining an extension of the main portion of the cylindrical cavity. In such an embodiment a coil spring may surround the sleeve. One end of the coil spring is fixedly attached to the brake arm and the other end of the coil spring is fixedly associated with the bike frame. A cylindrical bushing may be received within the uniform diameter body of the attachment stud.

Another embodiment of the present invention is a cantilever brake attachable to the uniform attachment studs described above. The cantilever brake includes a pair of elongate brake arms. A pair of brake pad adjustment assemblies receive one of each of the brake arms, the brake pad adjustment assemblies being moveable lengthwise of the brake arms and rotatable about a cylindrical brake arm. Each adjustment assembly includes a first clamp for gripping a pad post of a brake pad assembly and a second clamp for maintaining the brake pad adjustment assembly at a select position lengthwise and rotation wise about the brake arm. The brake pad adjustment assembly is configured to maintain the brake pad post between the brake arm and a cycle frame. A brake arm base is integral with each of the brake arms at a proximal end of each brake arm. The brake arm base forms a cylindrical cavity transverse of the brake arm and has a main body portion of a diameter to receive a main body portion of an attachment stud. An enlarged diameter portion of a diameter to receive the head of an attachment bolt extends beyond the distal end of the attachment stud. The brake arm extends from the brake arm base above the enlarged diameter portion and beyond the distal end of the attachment stud so as to provide an operating space for the brake pad adjustment assembly between the brake arm and the cycle frame.

The off-set brake arm cantilever brake of the present invention causes the resultant force stemming from a braking action to act on the main body portion of an attachment stud instead of beyond the attachment stud. In this manner, the off-set brake arm minimizes the torque applied to the base of an attachment stud, thereby minimizing deflection of the attachment stud which would otherwise give the brakes a soft or squishy feeling. In addition, with the resultant force being imparted directly on the attachment stud instead of beyond the attachment stud, the attachment stud and brake arm base are less subject to uneven wear. These very significant advantages are achieved with a cantilever brake that is not significantly more difficult or expensive to fabricate or assemble than prior art cantilever brakes.

DETAILED DESCRIPTION OF THE PREFERRED EMBODIMENT

Figure 1:
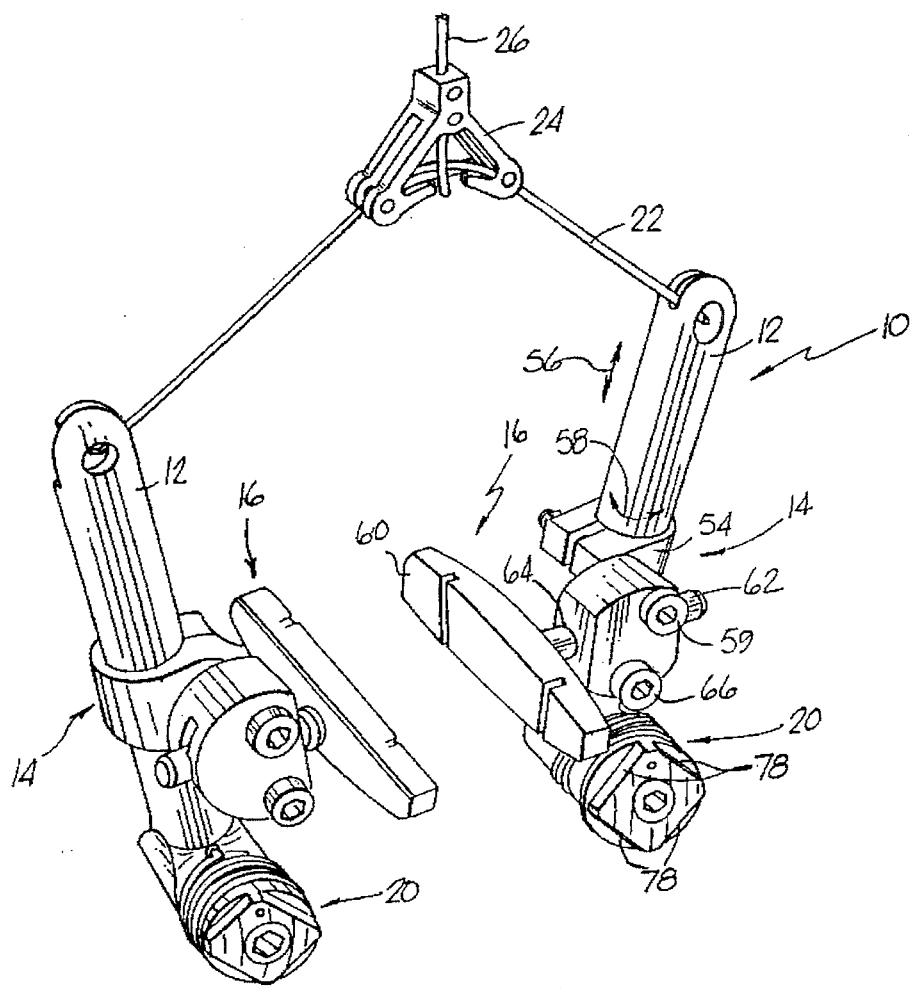
FIG. 1 is a perspective view of a cantilever brake in accordance with the present invention.

An assembled cantilever brake 10 of the present invention is illustrated in FIG. 1. The cantilever brake consists of a pair of brake arms 12 each having a brake adjustment assembly 14 attached thereto. Each of the brake pad adjustment assemblies 14 secures a brake pad assembly 16 in an operative position relative to a cycle wheel rim 18 (see FIGS. 4 and 5). A return tension adjuster 20 is attached to the proximal end of each brake arm 12 to bias the brake arms 12 away from each other and away from a rim 18 disposed therebetween. The distal ends of the brake arms 12 are joined by a straddle cable 22. A straddle cable hanger 24 engages the straddle cable 22 and receives a brake cable 26. As is well understood by those skilled in the art, squeezing of a brake lever causes the brake cable 26 to rise, thereby raising the straddle cable 22 and causing the brake arms 12 to be drawn toward one another, thereby imparting a braking force on a rim 18 disposed between the brake pads 16.

Figure 2:
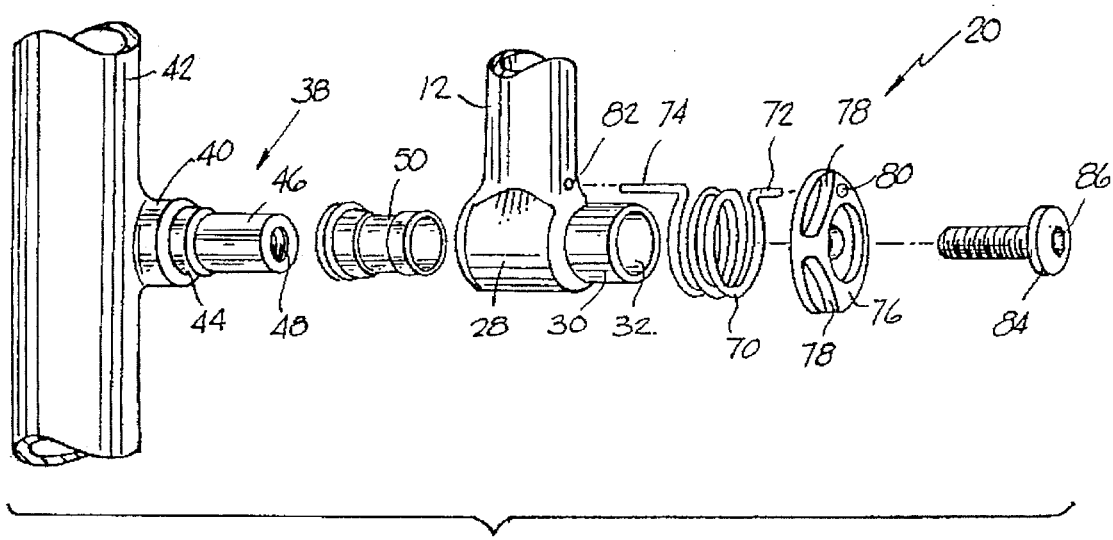
FIG. 2 is an exploded view of the base portion of the cantilever brake of FIG. 1 including its associated components, a cycle frame and an attachment stud of a cycle frame.
Figure 3:
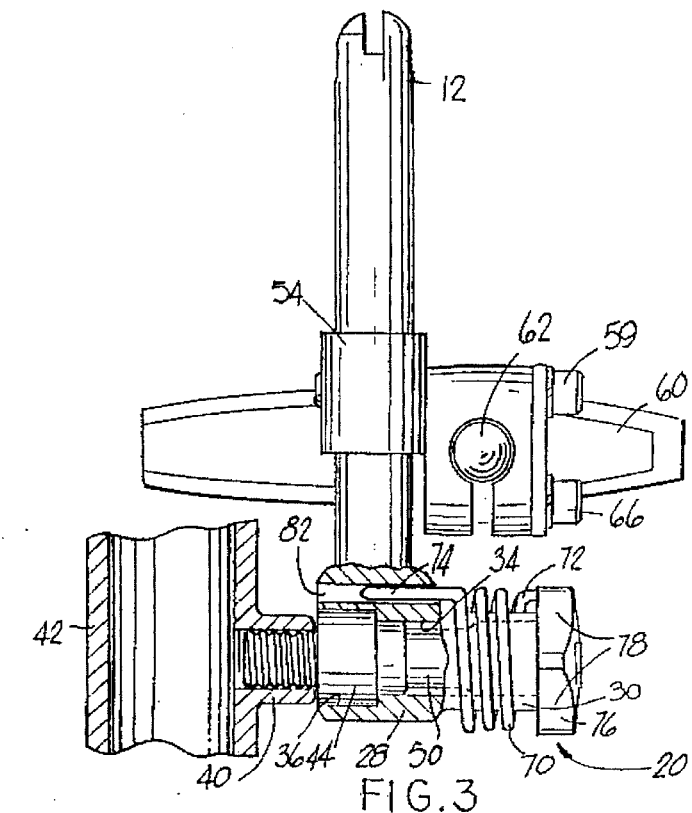
FIG. 3 is an elevational view of a single brake arm of the present invention with the cycle frame shown in cross section and a portion of the brake arm base cut away.

As best illustrated in FIGS. 2 and 3, each brake arm 12 has a brake arm base 28 at its proximal end which includes a sleeve 30 extending from one end. The brake arm base defines a cylindrical cavity 32 having a main portion 34 and an enlarged diameter portion 36. As best seen in FIG. 3, the main portion 34 extends through the sleeve 30. The cylindrical cavity 32 is dimensioned to receive an attachment stud 38. The attachment stud 38 extends from an attachment boss 40 of a cycle frame 42. The attachment stud 38 includes an enlarged diameter shoulder 44 and a uniform diameter body 46 having a female threaded cavity 48 at its distal end. As best seen in FIG. 3, the enlarged diameter portion 36 of the cylindrical cavity 32 of the brake arm base 28 is configured to receive the enlarged diameter portion 44 of the attachment stud and main portion 34 of the cylindrical cavity 32 is configured to receive the uniform diameter body 46 of the attachment stud. A cylindrical bushing 50 is disposed between the uniform diameter body 46 of the attachment stud and the cylindrical cavity 32. The attachment stud 38 is, by convention, of uniform length and diameter. The shoulder 44 has a length of 5.5 mm and a diameter of 9.5 mm, and the uniform diameter body 46 has a length of 16.4 mm and a diameter of 8 mm.

Referring to FIG. 1, the brake pad adjustment assembly 14 includes a clamp 54 which axially receives the brake arm 12. The brake pad adjustment assembly 14 can slide lengthwise of the brake arm 12 as illustrated by the arrow 56 and is rotatable about the brake arm 12 as indicated by the arrow 58. The clamp 54 can be tightened about the brake arm 12 to secure the brake pad adjustment assembly 14 at a select position lengthwise and rotation wise of the brake arm 12 by tightening of the bolt 59. The brake pad assembly 16 includes a brake pad 60 and a pad post 62. As illustrated in FIG. 1, the pad post 62 is axially received in a split cylindrical cavity 64 in the brake pad adjustment assembly 14 which forms a second clamp. The brake pad assembly 16 can be moved in and out within the cylindrical cavity or second clamp 64 and rotated within the cylindrical cavity 64 to obtain a select position. The select position is maintained by tightening of the bolt 66.

The return tension adjuster 20 is best seen with reference to FIGS. 2 and 3 and includes a coil spring 70 having an adjuster tab 72 and a brake arm tab 74. A tension adjuster 76 has two pairs of opposing flats 78 (see FIG. 2) about its periphery and a spring hole 82. The coil spring 70 is configured to surround the sleeve 30 with the brake arm tab 74 received in an axial spring hole 82 in the brake arm base 28 and the adjustment tab 72 received in the spring hole 80 of the tension adjuster 76. The entire assembly is maintained together by the bolt 84 having an Allen-head slot 86 which threadably engages the female threaded cavity 48 of the attachment stud 38.

The brake arm 12 extends from the brake arm base 28 above the enlarged diameter portion 36 of the brake arm base cylindrical cavity 32. In this manner, the pad post 62 of the brake pad assembly 16 overlies the uniform diameter body 46 of the attachment stud 38. This relationship is seen in both FIGS. 3 and 5.

Figure 4:
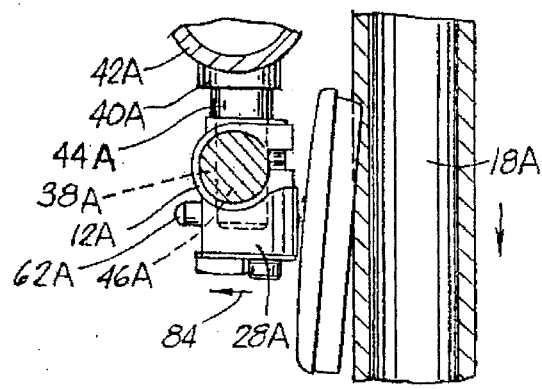
FIG. 4 is a top view of a prior art cylindrical brake arm cantilever brake acting on the rim of a cycle.
Figure 5:
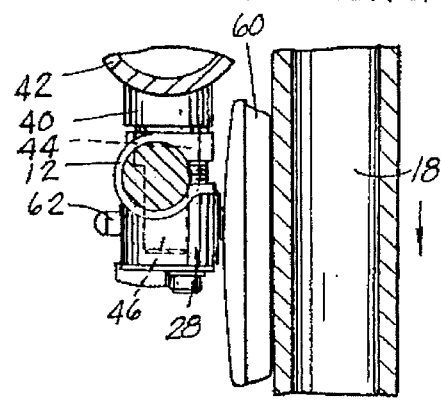
FIG. 5 is a top view of a cantilever brake arm in accordance with the present invention with the brake acting on a cycle rim.

A typical prior art structure is illustrated in FIG. 4. For ease of reference, the elements of the prior art illustrated in FIG. 4 which are the same or similar to the structure of the present invention are indicated by an "A" following the reference number. As seen in FIG. 4, the brake arm base 28A does not have an enlarged diameter portion 36 in the cylindrical cavity 32. Thus, the enlarged diameter portion 44A of the attaching stud 38A cannot be received under the brake arm 12. As a result, the pad post 62A extends beyond the distal end of the uniform diameter body 46A of the attachment stud 38A. If the prior art cantilever brakes illustrated in FIG. 4 are applied forcefully, the attachment stud 38A can be caused to deflect to the left as illustrated by the arrow 84 in FIG. 4. This can cause a portion of the brake pad 60A to be pulled off of the rim 18A, or at least have significantly less force on the portion, thereby decreasing the effective area of brake pad in contact with the rim 18A, resulting in a loss of braking force. In addition, the deflection of the attaching stud 38A gives the prior art brakes a loose feeling which many performance cyclists such as performance mountain bike riders find objectionable. The prior art illustrated in FIG. 4 can also cause uneven wearing of a cylindrical bushing within the base 28A. As illustrated in FIG. 5, the brake arm base 28 is configured to receive the enlarged diameter portion 44 of the attachment stud 38 the brake arm 12 is moved closer to the cycle frame 42 allowing the pad post 62 to overlie the uniform diameter body 46 of the attachment stud 38. As a result, the deflection of the attachment stud illustrated in FIG. 4 is significantly reduced so that the brake pad 60 remains flush with the rim 18 when the brakes are vigorously applied. In addition, the uneven wear of the bushing 50 and the "soft" feel of the prior art brakes is significantly diminished.

Figure 6:
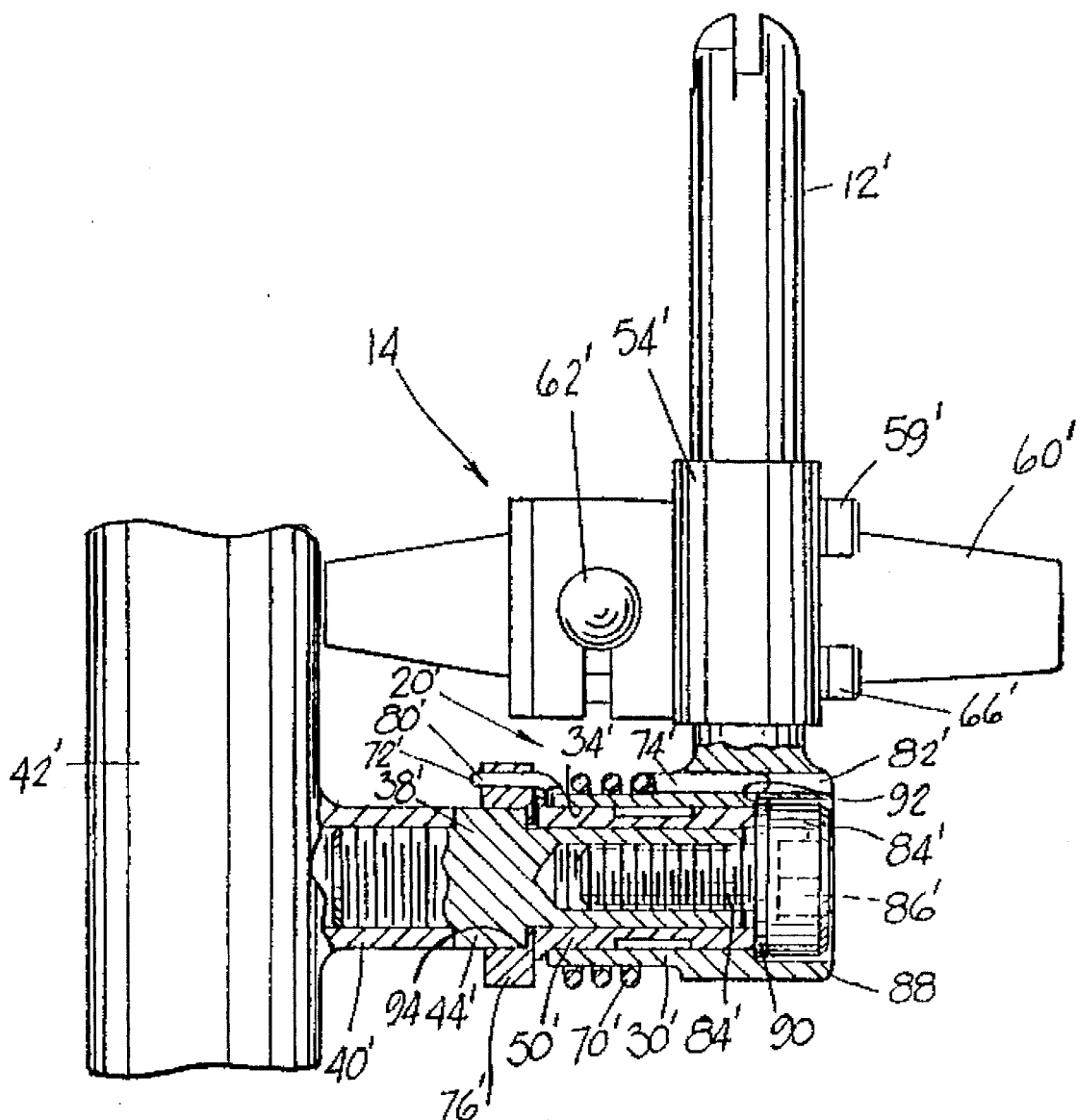
FIG. 6 is an elevational view of an alternate embodiment of the cantilever brake arm in accordance with the present invention with the base of the brake arm and attachment stud shown in partial cross section.

An alternate embodiment of the brake arm 12, indicated as 12' is illustrated in FIG. 6. Each of the like elements of the brake arm of FIG. 1 will have the same reference number followed by a prime ('). The embodiment of FIG. 6 differs from that of FIG. 3 in that the brake pad adjustment assembly 14' lies between the brake arm 12' and the cycle frame 42'. In order that sufficient clearance exists for the brake pad adjustment assembly 14' so that the brake pad 60' will not hit the bike frame 42', the brake arm 12' is offset distally from the attachment stud 38'. The offset is accomplished by constructing an enlarged diameter portion 88 at the distal end of the brake arm sleeve 30', the enlarged diameter portion 88 being configured to receive the head of the bolt 84. A washer 90 is disposed between the head of the bolt 84' and the distal end of the cylindrical bushing 50'. The washer engages a shoulder 92 between the enlarged diameter portion 88 and the main portion 34'. The return tension adjuster 20' also resides between the brake arm 12' and the cycle frame 42'. A spring 70' having an adjuster tab 72' and a brake arm tab 74' surrounds the exterior of the sleeve 30' with the brake arm tab 74' residing in a slot 82' at the base of the brake arm 12 and the adjuster tab 72' residing in a hole 80' in the adjuster 76'. As clearly viewed in FIG. 6, the tension adjuster 76' receives the enlarged portion 44' of the attaching stud 3 8' within a stepped cavity 94.

The cylindrical brake arm for a cycle of the present invention off sets the brake arm either forward or backward relative to the bike frame so as to maintain the point of attachment of a brake pad assembly over a main body portion of an attachment stud. The claimed off-set is unique to cylindrical brake arms and allows cylindrical cantilever brake arms to have the advantages of cylindrical brake arms and other brake arms without the previously known disadvantages of asymmetrical brake arms and prior art any cylindrical brake arms.

What is claimed is:

1. A cantilever brake attachable to a pair of attachment studs extending from a cycle frame, the attachment studs each having an enlarged diameter shoulder proximate the cycle frame and a uniform diameter cylindrical body extending from the enlarged diameter shoulder, the cantilever brake comprising:

a pair of elongate cylindrical brake arms;

a pair of brake pad adjustment assemblies, each brake pad adjustment assembly receiving one of the pair of cylindrical brake arms, each brake pad adjustment assembly being movable lengthwise of the cylindrical brake arm and being rotatable about the cylindrical brake arm and including means for gripping a pad post of a brake pad assembly and means for maintaining the brake pad adjustment assembly at a select position lengthwise and rotation wise of the brake arm; and a brake arm base integral with each brake arm at a proximate end of each brake arm, the brake arm base forming a cylindrical cavity transverse the brake arm, the cylindrical cavity having a main portion of a diameter to receive a main body portion of an attachment stud and an enlarged portion at one end of a diameter to receive an enlarged shoulder of an attachment stud, the brake arm being rotatable around the attachment stud, the brake arm extending from the brake arm base over the enlarged diameter portion of the brake arm base cylindrical cavity, whereby with an attachment stud received in the cylindrical cavity and the pad post gripping means rotated away from the enlarged cylindrical portion, the pad post gripping means overlies the attachment stud.

2. The cantilever brake of claim 1 further including a cylindrical bushing within each brake arm base, the cylindrical bushing receiving the uniform diameter body of the attachment stud.

3. The cantilever brake of claim 1 wherein the brake arm base further includes a cylindrical sleeve extending beyond the brake arm opposite the enlarged diameter portion of the cylindrical cavity, the cylindrical sleeve defining an extension of the main portion of the cylindrical cavity.

4. The cantilever brake of claim 3 further comprising:

a coil spring surrounding the sleeve;

first attaching means for fixedly attaching one end of the coil spring to the brake arm; and second attaching means for fixedly attaching the other end of the coil spring to the cycle frame.

5. A cantilever brake attachable to a pair of cylindrical attachment studs extending from a cycle frame, the cylindrical attachment studs each having an enlarged diameter shoulder proximate the cycle frame and a uniform body extending from the enlarged diameter shoulder, the cantilever brake comprising:

a pair of elongate cylindrical brake arms;

a pair of brake pad adjustment assemblies, each brake pad adjustment assembly receiving one of the pair of brake arms, each brake pad adjustment assembly being movable lengthwise of the cylindrical brake arm and rotatable about the cylindrical brake arm and including means for gripping a pad post of a brake pad assembly and means for maintaining the brake pad adjustment assembly at a select position lengthwise and rotation wise about the brake arm, the brake pad adjustment assembly maintaining the brake pad post between the brake arm and the cycle frame; and a brake arm base integral with each brake arm at a proximal end of each brake arm, the brake arm base forming a cylindrical cavity transverse the brake arm, the cylindrical cavity having a main body portion of a diameter to receive a main portion of an attachment stud and an enlarged diameter portion being of a diameter to receive the enlarged body portion of an attachment stud, the brake arm extending from the brake arm base beyond the distal end of the attachment stud so as to provide an operating space for the brake pad adjustment assembly between the brake arm and the cycle frame.

* * * * *